Figure 1:
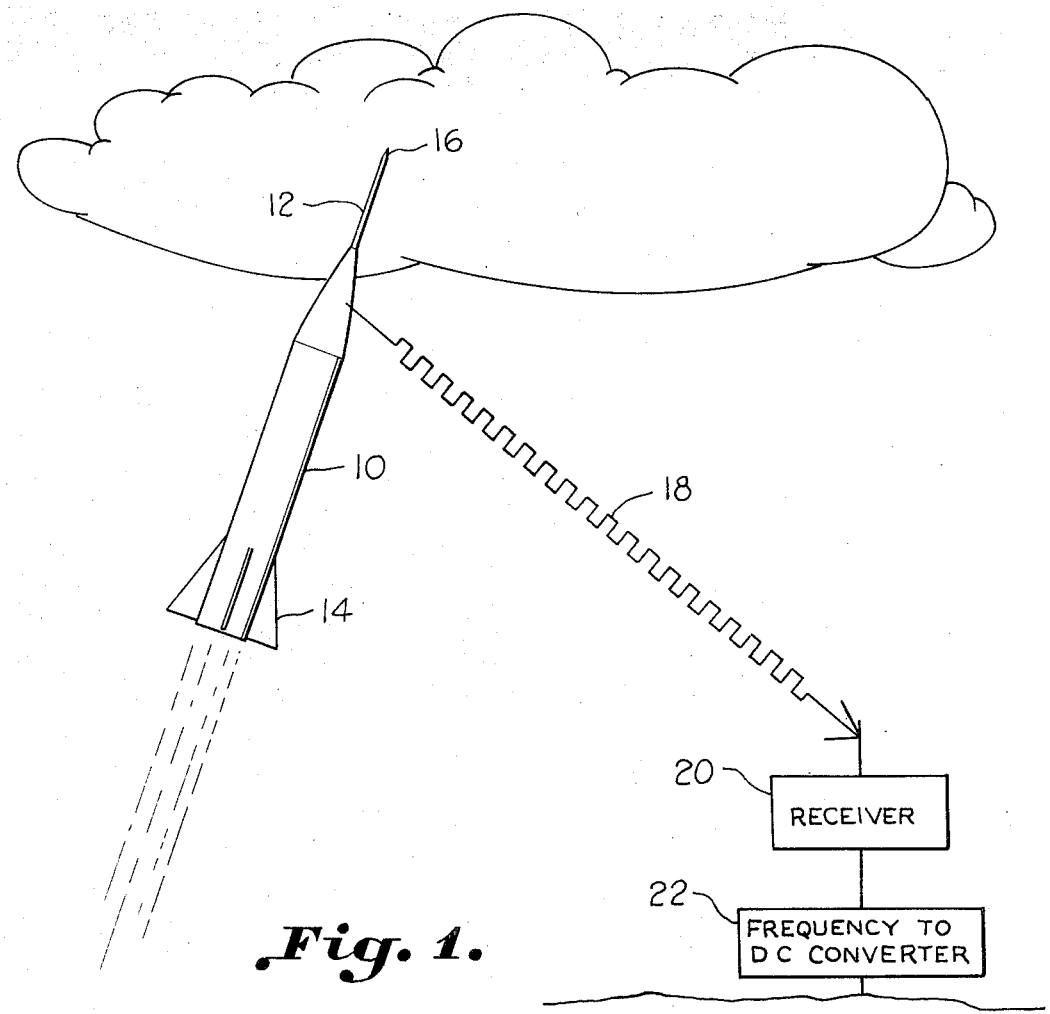

United States Patent [19]
Ruhnke

[11] 3,760,268
[45] Sept. 18, 1973

[54] ROCKET BORNE INSTRUMENT TO MEASURE ELECTRIC FIELDS INSIDE ELECTRIFIED CLOUDS

[75] Inventor: Lothar Ruhnke, Boulder, Colo.

[73] Assignee: The United States of America as represented by the Administrator of the National Aeronautics and Space Administration, Washington, D.C.

[22] Filed: Apr. 28, 1972

[21] Appl. No.: 248,469

[52] U.S. Cl. .............................................. 324/72
[51] Int. Cl. ........................................ G01r 29/12
[58] Field of Search ............................. 324/32, 72

[56] References Cited
UNITED STATES PATENTS

| 3,038,154 | 6/1962  | Zworykin et al. | 324/72 UX |
| 3,121,196 | 2/1964  | Kasemir         | 324/72 X  |
| 3,219,292 | 11/1965 | Chubb           | 324/72 X  |
| 3,222,562 | 12/1965 | Bennett         | 324/72 X  |
| 3,273,066 | 9/1966  | Ruhnke          | 324/72 UX |
| 3,283,241 | 11/1966 | Forbes et al.   | 324/72 X  |

Primary Examiner—Gerard R. Strecker
Attorney—James O. Harrell et al.

[57] ABSTRACT

An apparatus for measuring the electric field in the atmosphere which includes a pair of sensors carried on a rocket for sensing the voltages in the atmosphere being measured. One of the sensors is an elongated probe having a fine point thereon, which causes a corona current to be produced as it passes through the electric field. An electric circuit is coupled between the probe and the other sensor and includes a high ohm resistor which linearizes the relationship between the corona current and the electric field being measured. A relaxation oscillator and transmitter are provided for generating and transmitting an electric signal having a frequency corresponding to the magnitude of the electric field.

3 Claims, 2 Drawing Figures

Patented Sept. 18, 1973   3,760,268

ROCKET BORNE INSTRUMENT TO MEASURE ELECTRIC FIELDS INSIDE ELECTRIFIED CLOUDS

This invention described herein was made in performance of work under a NASA Contract and is subject to the provisions of Sections 305 of the National Aeronautics and Space Act of 1968, Public Law 85–568 (72 Stat. 435, 402 U.S.C.P. 2457).

This invention relates to an apparatus for measuring electric fields, and more particularly to a rocket provided with sensors for sensing the magnitude of electric fields.

The space industry particularly since the Apollo 12 launch which was struck by lightning has become particularly concerned with launching space vehicles through clouds which may discharge causing lightning to strike the vehicle. The chance of the clouds being discharged by the rocket increases considerably with the magnitude of the electric field inside the clouds.

The electric field in such clouds, in particular thunder clouds, is difficult if not impossible to determine from ground based sensors. Airplanes equipped with electric field sensors have successfully measured and determined the distribution of electric charges inside clouds; however, to infer from such measurements the distribution of the electric field, one must make assumptions about the distribution of the charges in the neighborhood of the charge centers. At the present not enough charge distribution in electric clouds have been observed to specify these needy assumptions. Direct measurements of the electric field inside thunder storms require that an aircraft penetrate the cloud at several levels. Such penetration leads to safety problems because of dangers of high turbulence and possible high lightning activity associated with these clouds. Balloons do not penetrate clouds fast enough and, also, do not have a flight path that can be predicted accurately.

Several methods are available to sense the electric field in thunder clouds and the like. One in particular includes a field mill on a fast moving rocket for measuring the vertical electric field component. Such is mechanically too complex and too difficult to design under present conditions. Radio active probe circuits involve difficult logistic procedures. Furthermore, such devices are also difficult to construct for high electric fields.

Because the sense fields vary very rapidly, the time reviewing each flight, and because measure times are short compared to the relaxation time of air, it is feasible to neglect the conductivity of air and consider electrostatic measure methods. An exposed conductor, e.g., a small sphere isolated from the body of the rocket and electrically connected to an amplifier with input time constance large compared with the flight time of the rocket will give readings proportional to the electric field, if the electric field at the start of the flight can be neglected. Unfortunately, such an exposed sphere can easily collect charges by impact with precipitation particles causing errors.

In accordance with the present invention, it has been found that difficulties encountered with other systems for measuring electric fields in clouds and the like can be overcome by providing a novel electric field measuring apparatus. This electric field measuring apparatus includes the following basic parts: (1) A self-propelled rocket with fins carried adjacent the rear end of the rocket, (2) an elongated probe having a corona point thereon, carried on the front of the rocket, (3) an electric circuit coupled between the elongated probe and one of the fins providing a current path for the corona current caused by the difference in voltage at the corona point and the fin, (4) a high ohm resistor connected within the circuit in series with the elongated probe for substantially linearizing the relationship between the corona current and the electric field being measured, (5) a relaxation oscillator coupled in the circuit for generating a chain of pulses having a frequency proportional to the difference in voltage at the corona point and the fin, and a transmitter coupled to the relaxation oscillator for transmitting the train of pulses to a remote station.

Accordingly, it is an important object of the present invention to provide an apparatus for measuring the electric fields of clouds and the like.

Another important object of the present invention is to provide an apparatus for measuring electric fields and the like, which generates a signal having a frequency that varies according to the density of the electric field.

Another important object of the present invention is to provide a simple and inexpensive device for measuring electric fields in thunder storms and the like.

Figure 2:
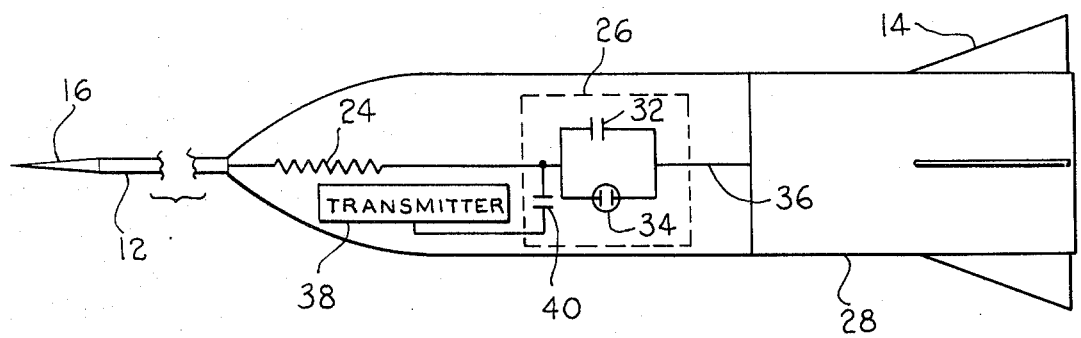

Other objects and advantages of this invention will become more apparent from a reading of the following detailed description and appended claims taken in conjunction with the accompanying drawing wherein:

FIG. 1 is a pictorial view illustrating a rocket constructed in accordance with the present invention generating signals proportional to the electric field of a cloud, FIG. 2 is a schematic diagram illustrating a rocket having a circuit positioned therein for generating signals indicating the electric field of clouds and the like.

Referring in more detail to FIG. 1 of the drawing, there is illustrated a rocket 10 traveling through the atmosphere provided with an apparatus for measuring the electric field of clouds and the like. The rocket 10 shown has a probe 12 with a very fine point 16 carried thereon for sensing the voltage produced by the electric field as such passes through the clouds. Another voltage sensing device is one of the fins 14 of the rocket. The electric field through which the rocket is passing is substantially equal to the potential difference between the point 16 of the probe 12 and the voltage sensing fin 14 divided by the distance between the point 16 and the fin 14. The electric field through which the rocket passes creates a corona current which flows through the probe 12, however, such is non-linear with regard to variations in the electric field. To eliminate the non-linearity, as well as the various factors that influence corona currents, the current from the sharp point 16 is fed through a high ohm resistor 24 to bias the corona point aginst the instrument ground. This makes the voltage drop over the resistor 24 large compared to to the voltage drop between the corona point 16 and the environment. Thus, the corona current measured is proportional to the electric field to a practical degree, if the electric field is higher than a certain threshold field. There is shown in FIG. 1 pulses 18 being transmitted from the rocket 10 which have a frequency directly proporational to the current flow between the point 16 of the probe 12 and the top of the fin 14. A receiver 20 is provided at ground station for receiving the pulses and feeding such to a frequency to D.C. convertor 22 for converting the pulses to an analog signal having an amplitude directly proportional to the electric field.

Referring in more detail to FIG. 2 of the drawing, there is illustrated schematically the rocket 10 having an elongated probe 12 mounted thereon. The elongated probe in one particular instance is constructed of 1/16 inch Tungsten steel rod and is approximately 4 inches long. The point 16 of the probe was sharpened by a grinding machine at a 10° angle with the actual point having a radius of approximately 20 microns. In order that the probe 12 be a voltage sensor under the condition desired to be measured, it must be sharp enough so that a corona current will flow from the point. This is the case if the electric field adjacent the point 16 is higher than approximately 3,000,000 volts per meter. The sharper the point the greater the electric field at the tip of the point. When there is 3,000,000 volts per meter at the tip 16 of the corona point there is only approximately 5 kilovolts per mter in the surrounding air.

The sharp edge of the fin 14 acts as another potential sensor. An electric circuit including linearizing resistor 24, relaxation oscillator 26, and the shell of the rocket 28 is interposed between the two voltage sensors, the point 16 of the probe 12 and the fin 14, respectively. The resistor 24 is a high ohm resistor, and in one particular embodiment, is in the order of 5,000 megaohms. This creates a voltage drop over the resistor 24 which is large compared with the voltage drop between the corona point 16 and the environment. Such makes the corona current flowing through the circuit substantially proportional to the electric field if the electric field is higher than 5 kilovolts per meter in the surrounding air. It has been found that resistors between 1,000 and 10,000 megaohms operate satisfactory for linearizing the corona current flowing through the circuit.

Connected to the linearizing resistor 24 is the relaxation oscillator 26, which includes a capacitor 32 connected in shunt with a neon bulb 34. A lead 36 is provided for coupling the relaxation oscillator to the shell 28 of the rocket for completing the circuit. The relaxation oscillator produces a chain of pulses 18, the frequency of which is directly proportional to the corona current flowing through the circuit. A transmitter 38 is carried in the rocket and is coupled to the relaxation oscillator 26 by means of a capacitor 40 for transmitting the chain of pulses back to a receiving station which includes the receiver 20 and the frequency to D.C. converter 22 located at the control center. In one particular embodiment, the corona current flowing through the circuit is 1 micro amp, therefore, the voltage drop across the 5,000 megaohm resistor 24 is 5,000 volts. This voltage drop is much larger than the voltage drop at the corona point 16 which causes the current flow to vary substantially directly proportional to the variations in the electric field surrounding the rocket.

From tests conducted in laboratories using simulated electric fields for creating corona current flow through the circuit, the electric field through which the rocket is passing can be determined.

In one particular application, the rocket was approximately two meters long and reached burn out after approximately two seconds at an altitude of about 1,000 meters. After burn out the rocket ballistically reaches an altitude of about 6,000 meters after 30 seconds and impacts the ground after about 70 seconds. The cloud base is reached after approximately 10 seconds at a velocity of 200 meters per second. This velocity decreases to about 25 meters per second at maximum altitude. During flight the rocket is probably never further than 10 kilometers from the launch pad. Maximum acceleration is 50 G's.

The electric field in the atmosphere or cloud varies strongly with position. Every 10 meters along the trajectory at least one reading of the electric field should be made and telemetered to the ground station if a charge pattern is to be derived from the data. Assuming a maximum velocity of ten hundred meters per second at cloud base and assuming that the electric fields are of interest mainly inside clouds, it is necessary that a data point be taken every 0.04 second. This means that the sensor for the electric field must have a relatively fast response. The magnitude of the electric fields vary from 30 volts per meter in fair weather at cloud level to 300,000 volts per meter inside thunder storms at conditions when lightning is initiated. This range, however, does not have to be covered by the instrument since the objective is to survey electric fields only in the range of interest to artificially initiate lightning. A realistic estimate is that the electric fields from 5,000 volts per meter to 100,000 volts per meter should be measured. Because of a very high availablity of the magnitude of electric fields inside clouds in space, as well as in time, and because of the large uncertainties involved in predicting triggered lightning from theortical considerations, there are no very high demands on the accuracy of measurements. Therefore, an accuracy of 20 percent is generally sufficient.

The position of the rocket at anytime during the flight must be known to relate the electric field to the location of observation. Also, here the accuracy required is not extreme. An accuracy of 20 percent of the altitude above the ground is sufficient. The trajectory of the rocket may be calculated by computors or synchronized through radar information.

While a preferred embodiment of the invention has been described using specific terms, such description is for illustrative purposes only, and it is to be understood that changes and variations may be made without departing from the spirit or scope of the following claims:

1. An apparatus for measuring the electric field in the atmosphere comprising:
    A. self-propelled rocket capable of being propelled through the atmosphere,
    B. an elongated probe carried by said rocket constructed of 1/16 inch diameter tungsten steel rod and having a point being sharpened at a 10° angle,
    C. fins carried by said vehicle spaced a predetermined distance from said elongated probe,
    D. an electrical circuit connecting said elongated probe and at least one of said fins,
    E. a high ohm resistor coupled in said electrical circuit between said, elongated probe and said one of said fins, and
    F. a relaxation oscillator coupled in said circuit for generating a chain of pulse having a frequency proportional to the difference in voltage at, said elongated probe and said one of said fins,
    whereby the frequency of said chain of pulses is proportional to the electric field through which said vehicle is traveling.

2. An apparatus for measuring the electric fields in clouds and the like comprising:
  A. a self-propelled rocket,
  B. fins carried adjacent the rear end of said rocket,
  C. an elongated probe having a corona point thereon carried on the front of said rocket,
  D. an electric circuit coupled between said elongated probe and said one of said fins providing a current path for corona current caused by the difference in voltage at said corona point and said one of said fins,
  E. a high ohm resistor connected in said circuit in series with said elongated probe for substantially linearizing the relationship between said corona current and said electric field being measured, and
  F. means for transmitting a signal having a frequency corresponding to the amplitude of said corona current.

3. The apparatus as set forth in claim 2, wherein said resistor is a 5,000 megaohm resistor.

* * * * *